May 26, 1964    R. J. NEWMAN    3,134,944
SYSTEM FOR TESTING FORWARD CURRENT AND PEAK INVERSE
VOLTAGE CHARACTERISTICS OF SEMICONDUCTOR
POWER TRANSLATION DEVICES
Filed July 25, 1960
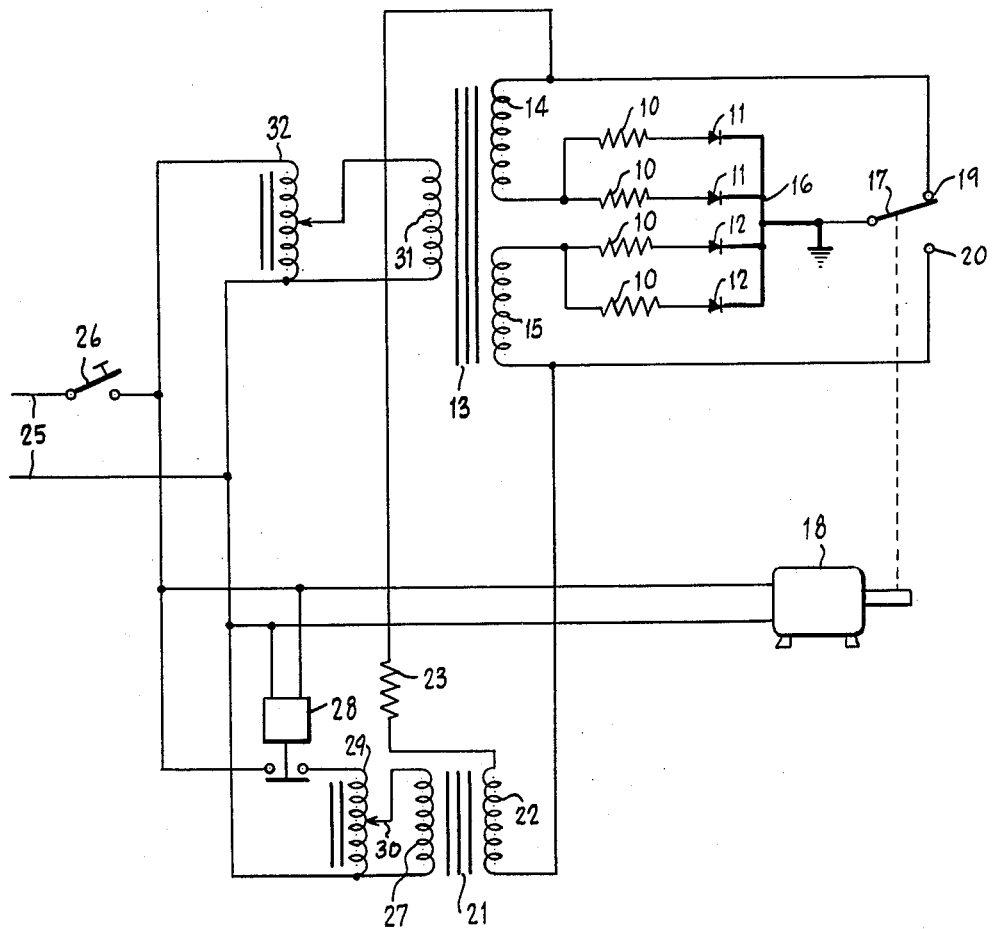
INVENTOR.
RICHARD J. NEWMAN
BY
*John A. Harvey*
ATTORNEY

United States Patent Office 3,134,944
Patented May 26, 1964

3,134,944
SYSTEM FOR TESTING FORWARD CURRENT AND PEAK INVERSE VOLTAGE CHARACTERISTICS OF SEMICONDUCTOR POWER TRANSLATION DEVICES
Richard J. Newman, West Orange, N.J., assignor to The Daven Company, Livingston, N.J., a corporation of Delaware
Filed July 25, 1960, Ser. No. 45,013
4 Claims. (Cl. 324—158)

The present invention relates to systems for testing semiconductor power translation devices and, particularly, to systems for testing semiconductor power diode rectifiers.

It is often desirable to test the forward current and peak-inverse voltage characteristics of semiconductor power diode rectifiers. As explained in the copending application of Allan Lloyd, Serial No. 45,012, filed July 25, 1960, now abandoned, this has heretofore been accomplished by testing at the full rated current and by use of a voltage source providing the maximum permissible value of peak-inverse voltage thus requiring large amounts of uneconomic power dissipation in load resistors. The test system disclosed in the Lloyd application minimizes the test power requirements by employing a synchronously connected alternating voltage source only sufficiently large as to produce the rated forward current flow through the diode rectifiers under test, and by using a further source of peak-inverse test voltage which is synchronously applied across the rectifiers under test with a polarity opposite to the direction of forward current flow so that minimum power is consumed from this source.

Semiconductor power diode rectifiers have relatively large cathode terminals which, during operation of the rectifier, are required to be in intimate electrical and thermal engagement with a metallic support member possessing high thermal conductivity so that heat is conducted rapidly away from the rectifier to minimize its internal temperature rise. The synchronous switching arrangement used in the Lloyd application test system results in the use of synchronous switch contacts which must be electrically insulated from the metallic cathode heat dissipation member provided for the diode rectifiers under test. Further, in the Lloyd system each pair of diode rectifiers under test has an individual load resistor, as is desirable to insure correct loading of each pair independently of other pairs tested concurrently, but these individual pair load resistors require that each test pair of rectifiers have its own individual metallic support member upon which the rectifier cathode terminals are mounted.

It is an object of the present invention to provide a new system for testing semiconductor power translation devices which enables all devices under test to have a common cathode metallic support member.

It is a further object of the invention to provide an improved testing system of the type described wherein one terminal of a synchronously operated switch of the system may be electrically connected to the same metallic support member which supports and electrically connects the cathode terminals of all devices under test into the system, and thus one which enhances the simplicity and economy of construction.

Other objects and advantages of the invention will appear as the detailed description thereof proceeds in the light of the drawing forming a part of this application and in which the single figure thereof is a circuit diagram of a test system embodying the present invention in a particular form.

Referring now more particularly to the single figure of the drawing, a test system embodying the present invention includes a power dissipative load resistor 10 for each of a plurality of semiconductor power diode rectifiers 11, 12 under test and arranged in test groups as shown. For simplicity, only two diode rectifiers are shown in each test group but it will be understood that each such group will usually include a much larger number of rectifiers and their individual load resistors. A power transformer 13 has two secondary windings 14 and 15 providing equal values of relatively low alternating voltage, one terminal of the secondary winding 14 being connected to the load resistors 10 associated with the group of diode rectifiers 11 under test while one terminal of the transformer winding 15 similarly is connected to the load resistors 10 associated with the second group of diode rectifiers 12 under test. The cathode terminals of all of the diode rectifiers under test are electrically connected to a common metallic support member 16 shown in heavy lines and suitably comprised of a sheet of heavy metal with which the cathode terminals of the diode rectifiers are in intimate thermal engagement to enable the support member 16 to conduct heat rapidly away from the rectifiers and thus minimize their internal temperature rise.

The metallic support member 16 is conveniently considered an electrical ground member for the test system, and the transfer contact 17 of a synchronously operated switch is electrically connected to it. The synchronously operated switch may be of any suitable form, and is here shown as of the type wherein a synchronously operated electric motor 18 is mechanically connected to operate the transfer contact 17 and thereby complete an electrical circuit alternately to two stationary contacts 19 and 20 of the switch. The contacts 19 and 20 are connected to terminals of the respective transformer windings 14 and 15 opposite the terminals to which the load resistors 10 are connected, and thus alternately complete an electrical circuit to produce forward current flow from the winding 14 through the diode rectifiers 11 under test and from the transformer winding 15 through the diode rectifiers 12 under test.

A transformer 21 has a secondary winding 22 providing a source of relatively high peak-inverse test voltage, the winding 22 being connected through a current limiting protective resistor 23 across the terminals of the transformer windings 14 and 15 to which the synchronous switch contacts 19 and 20 are connected. The phase or polarity of the voltage developed in the secondary winding 22 is so related to that of the transformer windings 14 and 15 that the peak-inverse test voltage is applied, during alternate half cycles of the test voltage, across the group of diode rectifiers 11 or 12 which is non-conductive. Thus the transformer windings 14 and 15 alternately produce rated forward current flow through the groups of diode rectifiers 11 and 12 under test, as controlled by the closing of the transfer contact 17 to the stationary contacts 19 and 20 in synchronism with half cycles of voltage of the transformer windings 14 and 15, while at the same time the inverse-peak test voltage is applied to the non-conductive diode rectifiers with a polarity opposite to the direction of their forward current flow.

The test system is energized from a source 25 of alternating voltage through a manually actuable switch 26, and the transformer 21 has a primary winding 27 which is energized from this source through the normally open contacts of a time delay relay 28 and an auto-transformer 29 having a movable contact 30 by which to adjust the magnitude of the peak-inverse test voltage. The transformer 13 similarly has a primary winding 31 which is likewise energized through an auto-transformer 32 to adjust the magnitude of the test current. The protective resistor 23 prevents any appreciable current flow from the secondary winding 22 of the transformer 21 in the event that a diode rectifier under test should fail to withstand the peak-inverse test voltage. The resistor 23 would also, in the absence of the time delay relay 28, provide a measure of protection to the peak-inverse voltage transformer during the time required for the motor 18 to reach synchronous speed after closure of the switch 23. However, the time delay relay 28 is preferably used to accomplish this protective function and operates to provide a slight time delay to enable the motor 18 and associated synchronously operated switch to reach full speed before application to the test system of the peak-inverse test voltage by energization of the transformer 21.

It will be apparent that the test system just described enables the testing of power translation devices in economical manner and under conditions of their maximum rated forward current and permissive peak-inverse voltage, and is one which provides adequately large thermal dissipation from the devices under test by means of a single metallic support member common to all of the devices. The physical construction involved is thus a relatively simple and economical one, particularly in that the unitary metallic support member may be readily fabricated of sufficiently heavy material as to have an adequately high value of thermal conductivity and an adequately low value of electrical conductivity for the rather large values of total test current (of the order of several hundred amperes) required concurrently to test large quantities of such power translation devices.

While a specific form of invention has been described for purposes of illustration, it is contemplated that numerous changes may be made without departing from the spirit of the invention.

What is claimed is:

1. A system for testing semiconductor power translation devices comprising two sources of relatively low alternating voltage, each said source including two terminals and the voltages of said sources having the same frequency and unlike instantaneous relative polarities with respect preselected ones of said terminals, metallic support means having appreciable electrical and thermal conductivity, a pair of load impedances individually electrically coupling said preselected unlike polarity terminals of said sources to one terminal of an individual one of a pair of two-terminal semiconductor power translation devices which are under test and which have a second electrical and thermal dissipation terminal in intimate electrical and thermal engagement with said support means, synchronous switching means for alternately and successively completing an electrical connection between a second terminal of said sources and said support means in synchronous relation to the voltages of said sources to produce substantial forward current flow alternately through said devices under test, and a source of peak-inverse test voltage connected across said second terminals of said first-mentioned sources and with a polarity which at any time is opposite to the direction of forward current conduction of the non-conductive one of said devices.

2. A system for testing semiconductor power diodes comprising two sources of relatively low alternating voltage, each said source including two terminals and the voltages of said sources having the same frequency and unlike instantaneous relative polarities with respect preselected ones of said terminals, metallic support means having appreciable electrical and thermal conductivity, a pair of load impedances individually electrically coupling said preselected unlike polarity terminals of said source to the anode terminal of an individual one of a pair of two-terminal semiconductor power diode devices which are under test and which have electrical and thermal dissipation cathode terminals in intimate electrical and thermal engagement with said support means, synchronous switching means for alternately and successively completing an electrical connection between a second terminal of said sources and said support means in synchronous relation to the voltages of said sources to produce substantial forward current flow alternately through said devices under test, and a source of peak-inverse test voltage connected across said second terminals of said first-mentioned sources and with a polarity which at any time is opposite to the direction of forward current conduction of the non-conductive one of said devices.

3. A system for testing semiconductor power diodes comprising a transformer having two low voltage windings, each said winding including two terminals and the voltages of said windings having unlike instantaneous relative polarities with respect preselected ones of said terminals, metallic support means having appreciable electrical and thermal conductivity, a plurality of power dissipating resistors electrically coupling said preselected unlike polarity terminals of said windings to the anode terminals of individual paired groups of two-terminal semiconductor power diode devices which are under test and which have electrical and thermal dissipative cathode terminals in intimate electrical and thermal engagement with said support means, synchronous switching means for alternately and successively completing an electrical connection between a second terminal of said windings and said support means in synchronous relation to the voltages of said windings to produce substantial forward current flow alternately through said paired groups of said devices under test, and a transformer having a high voltage winding connected across said second terminals of said first-mentioned windings and providing a peak-inverse test voltage which at any time has a polarity opposite to the direction of forward current conduction of the non-conductive group of said devices.

4. A system for testing semiconductor power diodes comprising a transformer having two low voltage windings of equal voltage values, each said winding including two terminals and the voltages of said windings having unlike instantaneous relative polarities with respect preselected ones of said terminals, metallic support means having appreciable electrical and thermal conductivity, power dissipation load resistors electrically coupling said preselected unlike polarity terminals of said windings to the anode terminals of paired groups of two-terminal semiconductor power diode devices which are under test and which have cathode terminals in intimate electrical and thermal engagement with said support means, synchronous switching means for alternately and successively connecting the second terminals of said windings to said support means in synchronous relation to the positive half cycles of the voltages of said windings to produce forward test current flow alternately through said paired groups of said devices under test, means for adjusting the voltages of said windings to adjust the value of said test current, and transformer means providing selectable values of peak-inverse test voltage applied across said second terminals of said windings with polarity opposite to the direction of said forward current conduction through said devices.

References Cited in the file of this patent

UNITED STATES PATENTS

| | | |
|---|---|---|
| 2,134,775 | Bergan | Nov. 1, 1938 |
| 2,459,849 | Stateman | Jan. 25, 1949 |
| 2,736,860 | Trousdale | Feb. 28, 1956 |
| 2,868,997 | Mitchell | Jan. 13, 1959 |
| 2,895,106 | Taunt | July 14, 1959 |
| 2,916,159 | O'Neill | Dec. 8, 1959 |
| 2,964,688 | McAdam | Dec. 13, 1960 |